United States Patent
Kleber et al.

(10) Patent No.: US 10,107,266 B2
(45) Date of Patent: Oct. 23, 2018

(54) DEVICE FOR REMOVING MOISTURE FROM A HYDRAULIC MEDIUM

(75) Inventors: Jörg Kleber, Neunkirchen (DE); Andreas Wilhelm, Dillingen (DE)

(73) Assignee: HYDAC FILTER SYSTEMS GMBH, Sulzbach/Saar (DE)

( * ) Notice: Subject to any disclaimer, the term of this patent is extended or adjusted under 35 U.S.C. 154(b) by 1647 days.

(21) Appl. No.: 13/261,541

(22) PCT Filed: May 14, 2011

(86) PCT No.: PCT/EP2011/002403
§ 371 (c)(1),
(2), (4) Date: Feb. 4, 2013

(87) PCT Pub. No.: WO2012/000584
PCT Pub. Date: Jan. 5, 2012

(65) Prior Publication Data
US 2013/0129512 A1     May 23, 2013

(30) Foreign Application Priority Data

Jul. 1, 2010 (DE) .................. 10 2010 025 736

(51) Int. Cl.
| | | |
|---|---|---|
| *F03D 80/70* | (2016.01) | |
| *F03D 15/10* | (2016.01) | |
| *B01D 1/14* | (2006.01) | |
| *C10M 175/00* | (2006.01) | |
| *F15B 21/04* | (2006.01) | |

(Continued)

(52) U.S. Cl.
CPC .............. *F03D 80/70* (2016.05); *B01D 1/14* (2013.01); *C10M 175/0091* (2013.01); *F03D 15/00* (2016.05); *F03D 15/10* (2016.05); *F15B 21/04* (2013.01); *F15B 21/041* (2013.01); *F03D 9/25* (2016.05)

(58) Field of Classification Search
CPC ...... F03D 11/0008; F03D 11/02; F03D 15/00; F16C 33/1045; F16C 33/105; F16C 33/667; F16N 2200/20; F16N 39/005
See application file for complete search history.

(56) References Cited

U.S. PATENT DOCUMENTS

| | | |
|---|---|---|
| 1,869,008 A | 7/1932 | Davis |
| 2,096,220 A | 10/1937 | Wilbur |
| 3,448,038 A | 6/1969 | Pall et al. |

(Continued)

FOREIGN PATENT DOCUMENTS

| | | |
|---|---|---|
| DE | 195 10 023 | 5/1996 |
| DE | 197 36 281 A1 | 2/1999 |

(Continued)

*Primary Examiner* — Dwayne J White
*Assistant Examiner* — Adam W Brown
(74) *Attorney, Agent, or Firm* — Wenderoth, Lind & Ponack, L.L.P.

(57) ABSTRACT

A device removes moisture from a hydraulic medium (2) with at least one gaseous drying medium (3). The drying medium (3) is air and/or some other working gas with a moisture absorption capability. The drying medium is conducted by a delivery device (4) from an area surrounding the hydraulic medium (2) to the hydraulic medium (2) when the moisture content of the gaseous drying medium (3) is lower than the degree of water saturation of the hydraulic medium (2).

20 Claims, 1 Drawing Sheet

(51) Int. Cl.
    *F03D 15/00*     (2016.01)
    *F03D 9/25*     (2016.01)

(56) References Cited

U.S. PATENT DOCUMENTS

| | | | | |
|---|---|---|---|---|
| 4,131,011 A | * | 12/1978 | Ling | D06F 58/28 73/29.01 |
| 6,447,573 B1 | * | 9/2002 | Rake | F16N 29/02 95/10 |
| 7,045,913 B2 | * | 5/2006 | Ebrahim | H02P 9/04 290/52 |
| 2002/0063087 A1 | | 5/2002 | Spearman et al. | |
| 2011/0049015 A1 | * | 3/2011 | Babcock | C10G 33/06 208/187 |

FOREIGN PATENT DOCUMENTS

| | | |
|---|---|---|
| DE | 100 31 004 B4 | 1/2002 |
| EP | 0 135 006 A2 | 3/1985 |
| EP | 1 736 665 A2 | 12/2006 |
| WO | WO 2009/087059 A1 | 7/2009 |

* cited by examiner

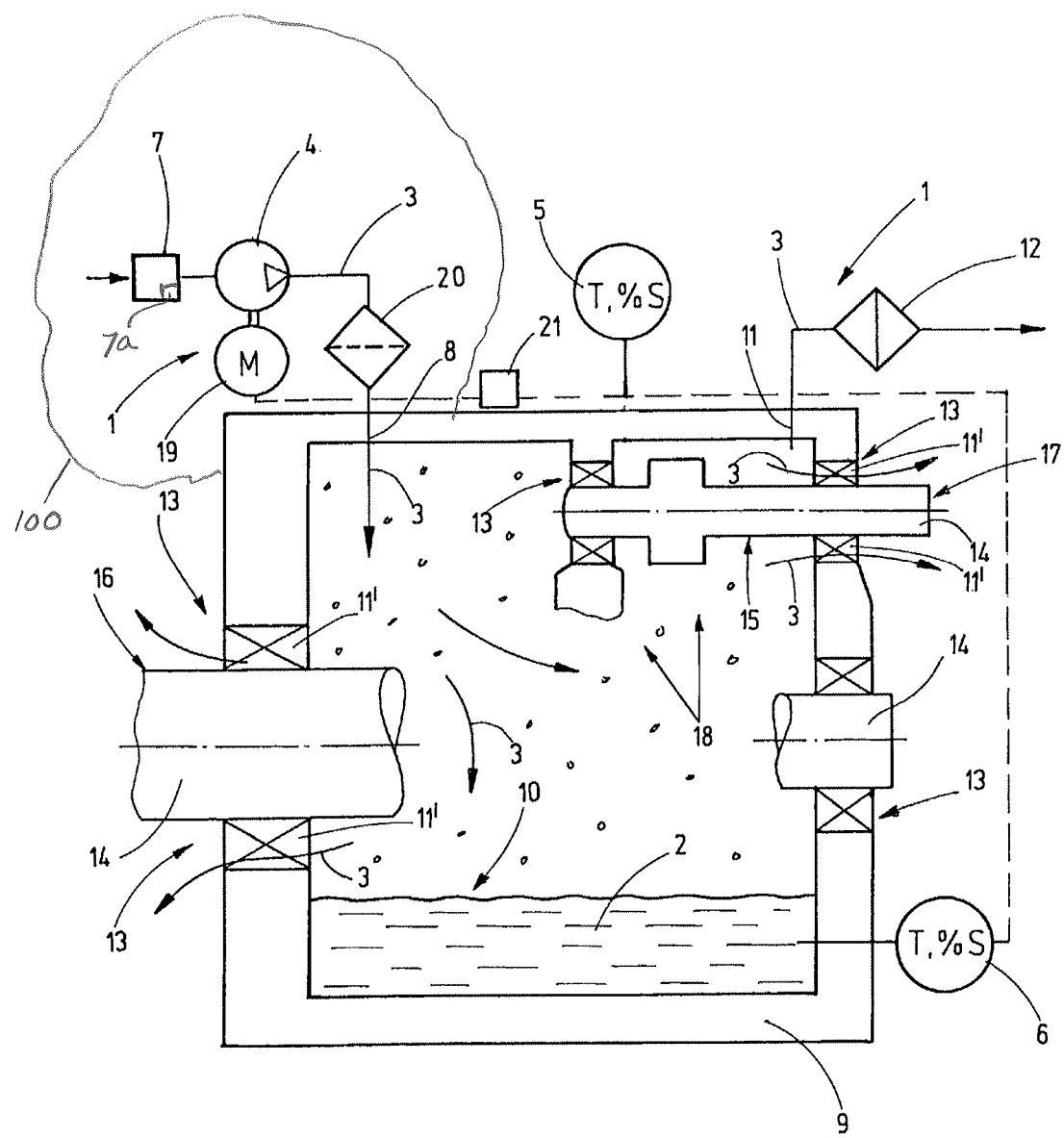

DEVICE FOR REMOVING MOISTURE FROM A HYDRAULIC MEDIUM

FIELD OF THE INVENTION

The invention relates to a device for removing moisture from a hydraulic medium with at least one gaseous drying medium.

BACKGROUND OF THE INVENTION

In hydraulic systems, for example, in the form of large gear units, the hydraulic media, such as lubricants or the like, are exposed to changing environmental conditions. The result can be an undesired introduction of particles, also in the form of water, into the lubricant. This state is basically associated with a degradation of the physical properties of the hydraulic media, in particular with respect to the targeted lubricating power of such lubricants. A typical representative problem constitutes the gear units of wind turbines. To transform the speed of a rotor of a wind turbine to a speed that is suitable for driving a generator, spur gear systems in the manner of planetary gear trains or systems comprising a pair of gear rings are customarily used. The rotor has a hub with two or more blades and has for the gear unit a drive with a high torque at a well-known very low speed. The gear unit in turn has for the generator a drive with a lower torque at, for example, a speed transformation of 80-fold.

For this reason, for more than 20 years, for example, planetary gear units, which are comparatively compact with respect to the installation requirement are used in practice. Such speed transforming gears are in many respects units with components that are exposed to stress, so that the wear of such units has to be minimized, because the maintenance, repair, and replacement of the key wear components of such gear units is often time consuming and cost intensive.

Since some of the components of such gear units stand as high as a man, they can be greased at the respective gearwheels and bearing locations either by oil recirculating lubrication systems with continuous transport and application of lubricant by gear oil pumps from a gear oil sump or by splash lubricating systems. In the case of splash lubricating systems, the gearwheels of the gear unit are partially immersed in immersion baths with a supply of lubricant.

Gear units, which are characterized in particular by a large volume or by large inner surfaces of the gear housing, tend to collect condensation water in their interior. This process is facilitated, especially in the case of iteratively operating gear units, by their episodically heating up and then subsequently cooling down.

Gear units of wind turbines are exposed, as a function of their installation site, more or less to cyclical operating and rest periods due to the fluctuation in the strength of the wind. In addition, even though these gear units are housed in system housings, for example, on a tower of a wind turbine, they are exposed more to the changing weather conditions, in particular the moist air, than is the case with other gear units, which are arranged stationarily in a defined environment. The result is that the water content in the lubricant of such gear units can increase. Water has an adverse effect on the physical properties of lubricants, such as gear oil, and can contribute to the premature aging of the lubricating oil, a feature that in turn has a damaging effect on the components of the gear unit.

In order to decrease the atmospheric moisture content in a gear housing and at the same time also the water content in the lubricating oil, for example, DE 100 31 004 B4 discloses use of a container with aluminum oxide that contains an absorptive agent for the humidity in the air. In the solution known from the prior art, the routing of the air flow is selected such that this air flows through the absorptive agent. Check valves are used for allowing the absorptive agent to flow through the container only when the air is delivered, but not when the air is removed. This arrangement prevents the oil laden air from flowing, for example, out of a gear sump, over which the dried air from the container sweeps.

In principle, EP 0 135006 A2 discloses configuring a device for aerating with dried air such that a chemically active desiccant is used, through which air flow can take place. As a result, the moisture is removed from this air. These prior art devices are suited for continuous operation with long maintenance intervals, the customary operating mode of a wind power system only under certain conditions. In addition, the volumetric flow rate of the dried air that is provided by such devices is limited.

EP 1 736 665 A2 discloses a method for removing the moisture inside the tower of a wind turbine. The prior art wind turbine comprises an interior, which is sealed off at least substantially against an air exchange, and a moisture extraction device. The moisture extraction device is connected to the interior by an inlet for moist air and an outlet for dry air, and is disposed between the moist air inlet and the dry air outlet. The moisture extraction unit known from the prior art draws off the moist air from the interior of the wind turbine, extracts water from the moist air, and returns the dried air back into the interior as a closed loop. A negative pressure area can be generated at the moist air inlet by sucking in the moist air from the interior. Correspondingly, an area exhibiting excess pressure can be generated at the dry air outlet by expelling the dried air into the interior. A drying air stream is then formed in the interior between the negative pressure area and the excess pressure area. The moisture extraction device extracts the moisture from the air from the interior and can comprise a heating unit.

SUMMARY OF THE INVENTION

An object of the present invention is to provide an improved device for removing moisture from a hydraulic medium with at least one gaseous drying medium, with this device being capable of permanently minimizing the moisture content of a hydraulic medium in a simple way.

This object is basically achieved with a device for removing moisture from a hydraulic medium that preferably uses air from the surrounding area of a hydraulic medium as the drying medium for drying the hydraulic medium, preferably without interpositioning of chemically active moisture absorbing agents. The air from the surrounding area of the hydraulic medium is delivered by the device to the hydraulic medium only if the air has a lower atmospheric moisture content than the air in the gear housing, for example, a lower moisture content than the degree of water saturation of the hydraulic medium that is converted to the temperature of the ambient air.

Especially in the case of gear housings having a large volume and correspondingly large surface areas on which the condensate can be formed, large volumetric flow rates of air are necessary to dry the hydraulic medium, which is present as the lubricant in a lubricant sump. In particular, the air or air that surrounds the hydraulic medium outside the gear unit and that is not conducted over a chemical absorbent lends itself especially well for this purpose, because this ambient air is available in unlimited quantities at no cost.

The device delivers, based on its design configuration, an air stream into the gear housing or to the hydraulic medium only if the moisture content of the air is lower than the degree of water saturation of the lubricant that is converted or adapted to the temperature of the air. When the ambient air flows over the lubricant or the hydraulic medium, this ambient air is then capable of extracting an adequate amount of water from said lubricant, in order to "dry" the lubricant in this way.

The device preferably comprises a sensor system, which is capable of determining the moisture content and the temperature of the ambient air as well as the moisture content and the temperature of the hydraulic medium. At the same time, inductive, capacitive, or other measurement methods may be used. A control and/or regulating unit of the device takes, as a function of the measured physical parameters, the air from the surrounding area and conveys this air to the respective hydraulic medium, which is stored preferably in the interior of a gear housing, when the air has a lower moisture content than the hydraulic medium itself or a quantity of the air supply that may be present above the hydraulic medium in the gear housing.

The control and/or regulating unit of the device for removing moisture from a hydraulic medium preferably actuates a fan, which is put into operation as soon as the control and/or regulating unit detects a drying potential for the air in the surrounding area of the hydraulic medium. Moreover, the fan can be shut off for an intermittent drying operation of the hydraulic medium. The drying medium, i.e., air, can be produced, instead of through a fan, through diverting of a suitably strong air flow from the surrounding area of the hydraulic medium or the gear housing, such as from the surrounding area of a wind turbine tower or an associated system housing. Especially suitable for this purpose are, for example, inlet channels having an outer end, on which an inlet scoop is configured as a hood, to be able to withdraw air from the surrounding area with almost no pressure loss. Then, the ambient air flows at a slight pressure loss, for example, into the gear housing of the wind turbine to dry the lubricating oil, which may be found in the gear housing, by a turbulent flow over the lubricating oil, a feature that is especially energy efficient.

Prior to conveying to the hydraulic medium, the air, or more specifically the drying medium, can additionally be conducted over a heating unit. The heating element releases the air, or more specifically the drying medium, from the residual moisture, an arrangement that can significantly raise the possible absorption coefficient of water.

To achieve a suitably long retention time, the inlet opening for the drying medium on the gear housing is preferably set as far apart as possible from an outlet opening for the drying medium out of the gear housing. In addition, advantageously a drying filter can be provided for the drying medium upstream of the outlet opening.

The result of these proposed design measures is that the flow path of the air inside the interior of the gear housing is as long as possible. The retention time of the air or the drying medium in the gear housing can then be increased to the maximum amount. This arrangement ensures that the air can make spatial contact with the lubricant for a period of time that is as long as possible to dry the lubricant in the gear housing. Furthermore, this arrangement ensures a good water exchange between the lubricant and the ambient air or some other drying medium that is used and that can also be mixed with the air.

In an especially preferred embodiment, the outlet opening for the air, laden with moisture, is arranged in the vicinity of one or more bearing locations for the movable components in the gear housing. Advantageously, a bearing nest or a bearing itself for the movable parts or shafts in the gear housing can be provided with an outlet opening. This arrangement also allows a plurality of outlet openings, with the result that impurities cannot enter in the bearings. Such an introduction of impurities is prevented by the excess pressure in the gear housing, because only the drying medium can flow from the interior of the gear housing past the bearings to the exterior of the gear housing.

If the hydraulic medium to be dried is part of a gear unit in a wind turbine, advantageously the air or drying medium may be conveyed through a system housing comprising such units as transformers and power components, such as frequency converters and switching systems, to heat up and remove the moisture from the air or the drying medium. In this case, the air can also be used as a coolant for those modules.

In addition to the aforementioned ambient air as the drying medium, some other working gas having a suitable moisture absorbing capacity can be used. In this case, the air can also be present as a mixture with such a working gas. In an additional embodiment of the invention, the gaseous drying medium can also be provided additionally with moisture absorbing microparticles that absorb the corresponding moisture and then would also be removable again from the gaseous drying medium stream by a filter device. The particles can be processed again in a closed loop, in particular by removing the moisture by drying and then subsequently feeding again into the gas drying medium stream. In this respect, the closed loop can also be run with the respective drying medium without the infeed of particles.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a schematic side view of a gear unit of a wind turbine with a circuit diagram of a system for feeding ambient air into a gear housing of the gear unit according to an exemplary embodiment of the invention.

DETAILED DESCRIPTION OF THE INVENTION

FIG. 1 shows in schematic form, not drawn to scale, a partial longitudinal or side view of a device 1. This device is configured for removing moisture from a hydraulic medium 2 in a gear housing 9 of a wind turbine having a system or turbine housing 100. A gear unit 15 of this type is used in wind turbines, in which a rotor, which can be driven by wind power (not illustrated), delivers its driving power to an input shaft 16. Upon passing through the gear unit 15, the driving power is delivered to an output shaft 17, to which, for example, a generator for generating electric power can be connected. The rotor of a wind turbine has very low speeds and typically a high torque. Since a generator for generating electric power needs higher input speeds, the gear unit generally provides a speed increase ratio of, for example, 1:80. Types of gears, such as a planetary gear train or other spur gear systems with oblique or straight teeth, are also used in such wind turbines.

In the illustrated exemplary embodiment, the gear unit 15 is designed as a spur gear system comprising a plurality of gear stages 18, of which only the components or shaft ends are shown to some extent. In particular, gear units having two gear stages, of which the first gear stage is a planetary gear train and the second gear stage is preferably a spur gear system, can be used. The gear stages are surrounded by a gear housing 9 that is configured in the shape of a cylinder or a box.

The gear stages 18 are lubricated by a splash lubricating system. For this purpose, a supply of lubricant 10 in the form of a gear oil is provided in housing 9. In an immersion bath, which is formed in this way, the gearwheels (not illustrated) of the gear stages 18 are at least partially immersed, so that all of the engaged tooth flanks and also the face sides of the gearwheels are constantly coated with an oil.

Such gear units have a volume inside their gear housing that is not insignificant. The volume of air that is present in the gear housing 9 and that may be found over the lubricant 10 is exposed to temperature fluctuations that are induced, on the one hand, by the outside temperatures that change as a function of the weather and, on the other hand, by the non-uniform operation of such wind turbines due to an increase in temperature caused by friction and material expansion and the cooling down phases with respect to the gear unit. As a result, condensate forms on the walls of a gear housing 9, because these walls are often good heat conductors. The descending water flows into a lubricant sump and degrades the quality of the lubricant or the oil and, in so doing, shortens the oil or lubricant change intervals. In addition, the water may lead to corrosion in the interior of the gear housing 9. The oil aging of the lubricant can in turn cause damage to the gear unit itself.

To eliminate the cause for water entering into the lubricant 10, the invention provides, on the one hand, to eliminate the moist air that is present in the gear housing 9 and, on the other hand, to provide that the dry air is conducted into the gear housing 9. For this purpose, a device 1 is provided for removing moisture from a hydraulic medium 2. In this case, the device 1 ensures that ambient air is delivered into the gear housing 9 as drying medium 3 only if this air has a lower moisture content than the degree of water saturation of the lubricant 10 at comparable temperatures. If the gear unit heats up, most likely that water vapor will be permanently discharged from the lubricating oil into the surrounding area, located above the lubricating oil, inside the gear housing 9. The water is to be removed from the housing 9, as described above.

In the exemplary embodiment depicted in FIG. 1, the device for supplying the ambient air or for forming an ambient air stream into the interior of the gear housing 9 comprises a conveying device 4 in the form of an axial fan. The axial fan is driven by an electric motor 19 and sucks the ambient air into the gear housing 9, and then blows that air into the interior of the gear housing 9 through a filter 20 connected upstream of an input opening 8 on the gear housing 9. The fan runs only if the matching of sensor signals of a gas sensor 5 for determining the moisture content and the temperature of the drying medium 3 (ambient air) and of a hydraulic sensor 6 for determining the moisture content and the temperature of the lubricant 10 in a control and/or regulating unit 21 shows that the ambient air is capable of absorbing the water in the gear housing 9 and of removing water from the gear housing 9 through an outlet opening 11 or a plurality of outlet openings 11'.

As illustrated, a plurality of outlet openings 11' are on the gear housing 9. These outlet openings are arranged at the bearing locations 13 for the shafts 14 in an outer wall of the gear unit 9.

The ambient air, which has absorbed the water, can flow through the roller bearings of the shafts 14 directly from the inside to the outside. For the roller bearings to be traversed by flow, these roller bearings can exhibit in part passage points (not illustrated) for the air steam in the area of the bearing cages. In addition, the device ensures that the air laden with impurities cannot flow into the area of the bearing locations 13, because an excess pressure system from the inside to the outside is created relative to the interior of the gear housing 9. Since the ambient air is provided with water, suitable corrosion protection measures for the bearing locations of the shaft have been provided, however, as a general rule.

To the extent that the bearing locations 13 will not be used as the outlet opening 11', a delivery point at an outlet opening 11 on the gear housing 9 can be provided. This outlet opening is located as far away as possible from the inlet opening 8. This delivery point can be arranged downstream of the drying filter 12. The drying filter 12 preferably has a water absorbing material bed or the like and is traversed by flow from the outside to the interior of the gear housing 9 when the gear unit 15 is not running. As a result, the air in the gear housing 9 is cooling down, because, in such a case, the air in the interior of the gear housing 9 can contract as required. A vacuum suction device (not illustrated) can also be provided in the flow direction of the drying filter 12, downstream of this drying filter. This vacuum suction device can transport in a sucking manner the interior of the gear housing 9, or more precisely the ambient air that is laden with moisture, out of the gear housing. In the event of a backflow, which can also be suppressed, if desired, by means of a valve assembly, which is not shown in detail, the air, flowing back through the outlet opening 11, would be dried at the drying filter 12 in any event before entering into the gear housing 9.

A heating unit 7 can be arranged in the influent flow path of the ambient air stream to the gear housing 9. In this case, the waste heat from the power components 7a of the wind turbine can be used for heating to suitably reduce the moisture in the air flowing in the gear housing 9. As an alternative or in addition to the heating unit 7, as a function of the environmental conditions, a cooling device (not illustrated) can be used preferably to perform a cooling function up to below the dew point (dehumidifier).

Instead of the ambient air, some other working gas having a suitable moisture absorbing capacity as the drying medium can be used. Furthermore, the ambient air can be mixed with some other working gas. Moreover, a particle content can be introduced into the gaseous drying medium. This particle content lends itself especially well to absorbing moisture. As an alternative or in addition to the drying filter 12, a filter for separating the particles from the gaseous drying medium stream could then be provided.

While one embodiment has been chosen to illustrate the invention, it will be understood by those skilled in the art that various changes and modifications can be made therein without departing from the scope of the invention as defined in the claims.

The invention claimed is:

1. A device for removing moisture from a hydraulic medium having a degree of water saturation and a temperature, comprising:
   a supply of a gaseous drying medium, said gaseous drying medium having a moisture absorbing capacity, a gas temperature and a gas moisture content and being located in an area surrounding the hydraulic medium;
   a conveyor conducting said gaseous drying medium from said area surrounding the hydraulic medium only when the gas moisture content of the gaseous drying medium is lower than the degree of water saturation of the hydraulic medium;
   a gas sensor measuring the gas moisture content and the gas temperature of said gaseous drying medium conveyed to the hydraulic medium; and
   a hydraulic sensor measuring the degree of water saturation and the temperature of the hydraulic medium.

2. A device according to claim 1 wherein said gaseous drying medium comprises air.

3. A device according to claim 1 wherein said conveyor is actuatable by a control and regulating unit as a function of signals generated by said gas sensor and said hydraulic sensor and sent to said control and regulating unit.

4. A device according to claim 1 wherein a heating unit is connected to said conveyor and heats said gaseous drying medium conveyed by said conveyor.

5. A device according to claim 1 wherein said conveyor is connected to an inlet opening in a gear housing in which the hydraulic medium is located to convey said gaseous drying medium into said gear housing, said gas sensor being upstream of said inlet opening.

6. A device according to claim 1 wherein the hydraulic medium is a lubricant in a gear housing, said area being outside said gear housing.

7. A device according to claim 1 wherein said conveyor comprises a discharger that discharges said gaseous drying medium moving from the area surrounding the hydraulic medium.

8. A device according to claim 5 wherein said gear housing comprises an outlet opening located at a distance from said inlet opening, said gaseous drying medium issuing from said outlet opening.

9. A device according to claim 8 wherein a drying filter is connected to said outlet opening upstream of said outlet opening.

10. A device according to claim 8 wherein said gear housing comprises a bearing in a bearing location with a shaft coupled to said bearing, said outlet opening being on said bearing location.

11. A device according to claim 8 wherein said gear housing comprises a bearing in a bearing location with a shaft coupled to said bearing, said outlet opening extending around said bearing location.

12. A device according to claim 6 wherein said gear housing is part of a wind turbine.

13. A device according to claim 12 wherein said wind turbine comprises a housing having at least one of a transformer, frequency converter, or a switching unit having waste heat and providing a heating unit for said gaseous drying medium.

14. A method for removing moisture from a hydraulic medium having a degree of water saturation and a temperature, comprising the steps of:
   supplying a gaseous drying medium having a moisture absorbing capacity, a gas temperature and a gas moisture content in an area surrounding the hydraulic medium;
   measuring the gas moisture content and the gas temperature of the gaseous drying medium conveyed to the hydraulic medium with a gas sensor;
   measuring the degree of water saturation and the temperature of the hydraulic medium with a hydraulic sensor; and
   conducting the gaseous drying medium with a conveyor from the area surrounding the hydraulic medium to the hydraulic medium only when the gas moisture content of the gaseous drying medium is lower than the degree of water saturation of the hydraulic medium.

15. A method according to claim 14 wherein the gaseous drying medium comprises air.

16. A method according to claim 14 wherein the conveyor is actuated by a control and regulating unit as a function of signals generated by said gas sensor and the hydraulic sensor and sent to the control and regulating unit.

17. A method according to claim 14 wherein a heating unit is connected to the conveying device and heats said gaseous drying medium conveyed by the conveyor.

18. A method according to claim 14 wherein the conveyor conveys the gaseous drying medium to an inlet opening in a gear housing in which the hydraulic medium is located with the gas sensor measuring the gas moisture content and the gas temperature upstream of the inlet opening.

19. A method according to claim 18 wherein the gaseous drying medium is issued out of an outlet opening located at a distance from the inlet opening in the gear housing.

20. A method according to claim 14 wherein the hydraulic medium is in a gear housing of a wind turbine; and
   the gaseous drying medium is heated by waste heat from a turbine housing having at least one of a transformer, frequency converter, or a switching unit.

* * * * *